United States Patent [19]
Nordquist

[11] 3,936,224
[45] Feb. 3, 1976

[54] POWER TURBINE

[76] Inventor: Oscar M. Nordquist, 1931 N. Rainier, Bremerton, Wash. 98310

[22] Filed: July 25, 1974

[21] Appl. No.: 491,788

[52] U.S. Cl. ............................. 415/203; 415/186
[51] Int. Cl.² ...................................... F01D 1/18
[58] Field of Search ........ 415/202, 203, 265, 219 C, 415/185, 186, 189; 416/244

[56] References Cited
UNITED STATES PATENTS

| 15,384 | 7/1856 | Munroe | 415/203 |
| 800,485 | 9/1905 | Rhoades | 415/202 |
| 2,773,666 | 12/1956 | Martin | 415/205 |
| 2,926,886 | 3/1960 | Hertrich | 415/202 |
| 3,001,692 | 9/1961 | Schierl | 415/122 |
| 3,726,605 | 4/1973 | Bachl | 415/203 |

FOREIGN PATENTS OR APPLICATIONS

| 612,553 | 1/1961 | Canada | 415/186 |
| 602,960 | 9/1934 | Germany | 416/244 |

*Primary Examiner*—Henry F. Raduazo
*Attorney, Agent, or Firm*—Graybeal, Barnard, Uhlir & Hughes

[57] ABSTRACT

A sectionalized turbine wheel mounted for rotation about a vertical axis and having a plurality of turbine blades mounted to its circumference. There is an outer circumferential feeder pipe surrounding a distribution pipe that defines a distribution chamber, which in turn leads through a plurality of vane assemblies to the turbine blades. The turbine blades are substantially enclosed in a housing structure which provides an annular downward opening. Water under pressure flows into the feeder pipe, thence into the distribution chamber and through the vane means to impinge on the turbine blades, from which the water is discharged in a downward direction. The turbine blades are concave and curve in both a vertical and lateral plane, with the slope of the upper portion of the impact surface having a substantial horizontal component and the slope of the curve of the impact surface at the lower end being predominantly downward, to facilitate directing the water impacting the blades in a downward direction after impact. The main drive shaft from the turbine wheel connects to a speed augmenting gear transmission to rotate an output shaft at an increased rate of speed.

5 Claims, 10 Drawing Figures

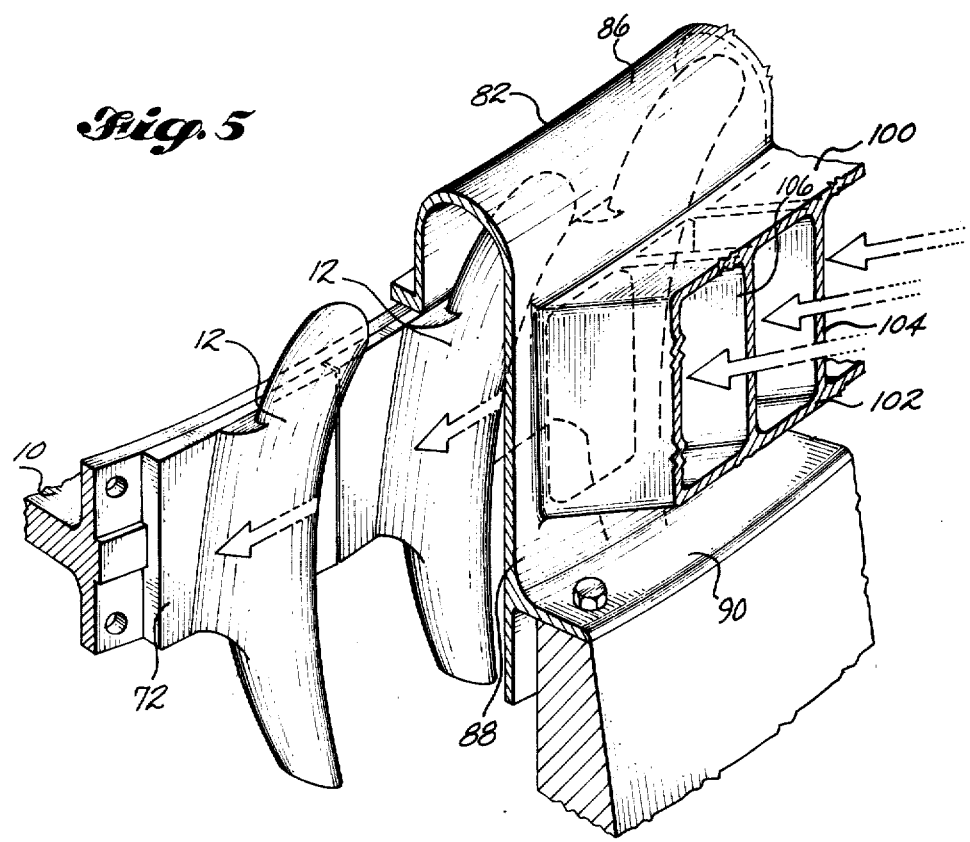
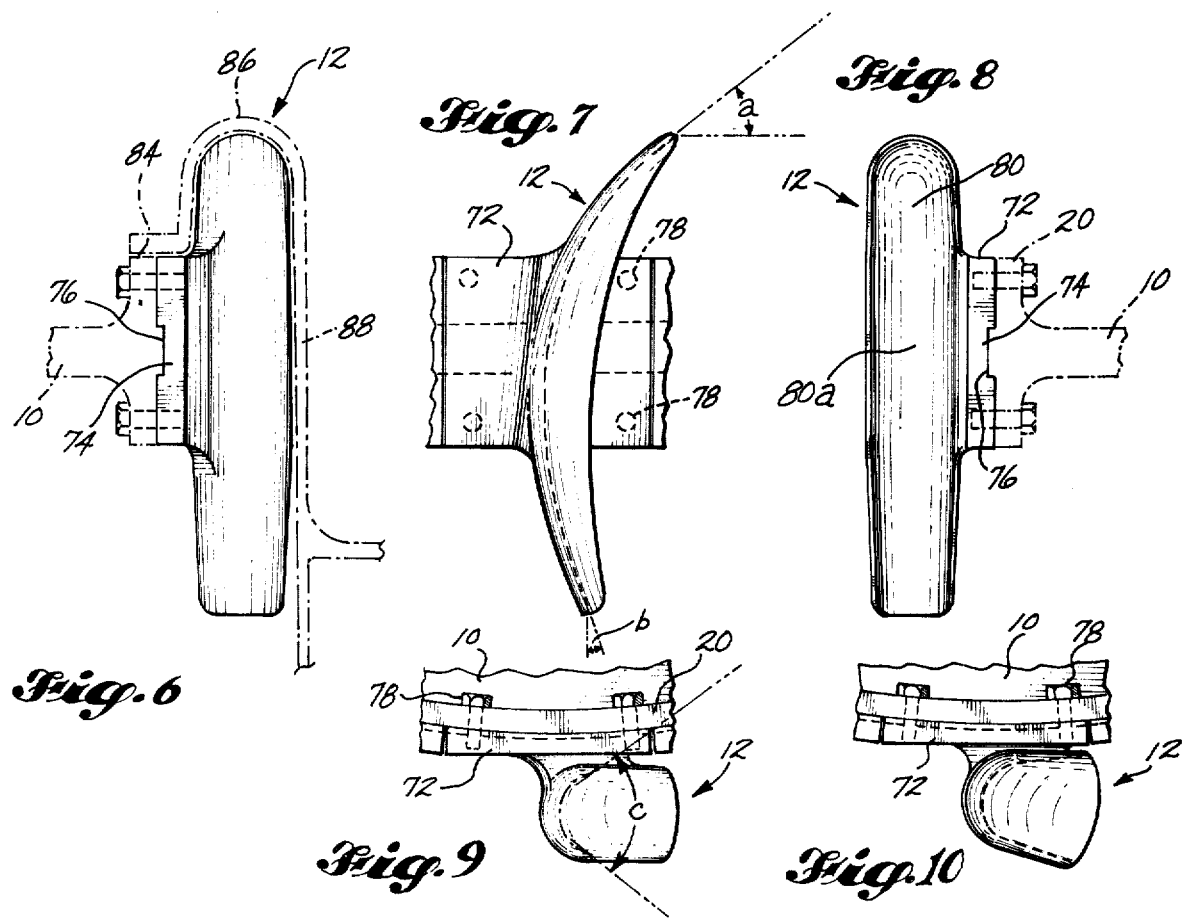

POWER TURBINE

BACKGROUND OF THE INVENTION

1. Field of the Invention

The present invention relates to a water turbine, and more particularly to a water turbine specifically adapted for generating power from a water source having a relatively low pressure head.

2. Description of the Prior Art

There are in the prior art various turbines for transforming the energy from a fluid source such as water to another energy form, such as electricity. In general, most of these turbines are high speed turbines adapted to operate with a fluid having a relatively high pressure head. While such turbines are certainly operable under various conditions of pressure, in many instances the components of the turbine are not arranged to operate with greater effectiveness with fluid at lower pressures.

Generally representative of the state of the art relating to turbines, and particularly turbines driven by water, are the following patents: U.S. Pat. No. 2,171, Lewis; U.S. Pat. No. 12,779, Hurt; U.S. Pat. No. 32,192, Kenyon & Brown; U.S. Pat. No. 40,986, Whalen; U.S. Pat. No. 174,649, Whipple; U.S. Pat. No. 578,759, McElroy; U.S. Pat. No. 716,047, Ingham; U.S. Pat. No. 798,577, Fiske; U.S. Pat. No. 877,523, Smith; U.S. Pat. No. 2,584,555, Cleave et al; U.S. Pat. No. 2,970,660, Bodine, Jr.; U.S. Pat. No. 3,010,247, Shapiro; and U.S. Pat. No. 3,214,990, Jekat.

It is an object of the present invention to provide a water turbine which is especially adapted for effective operation from a low pressure head water source, but which is also able to operate at higher pressures.

SUMMARY OF THE INVENTION

In the present invention, the apparatus comprises a main turbine wheel mounted for rotation about a generally vertical axis, with the turbine wheel preferably being made in sections that can be assembled at the installation site, this permitting the turbine wheel to have a relatively large diameter. There are a plurality of turbine blades mounted to the turbine wheel at spaced intervals along the circumference thereof. Positioned circumferentially around the area of the turbine blades is an annular water inlet structure defining an annular distribution chamber which leads through a vane structure to the area of the turbine blades. There is a turbine blade housing structure of a general annular configuration which substantially encloses the circular path of the turbine blades and provides a downwardly open discharge passage below the turbine path.

In the preferred embodiment of the present invention, each turbine blade has a concave impact surface which curves in both a vertical and horizontal plane. Desirably the slant of the impact surface at its upper end has a substantial rearward and upward slope component (in the order of a one to one slope), while the slant of the lower portion of the impact surface is predominantly downward and only moderately rearward. This enhances the proper downward discharge flow of the water impacting the turbine blades. In the lateral plane, the total curvature of the turbine blades is preferably at least approximately 90°, for better containment of the water and direction of the water along its downward discharge path.

Also, there is a main drive shaft fixedly connected to the wheel, which acts through a gear speed augmenting transmission to drive an output shaft at an increased speed, thus effecting more effective power transmission. There is a feeder pipe which extends generally circumferentially around the distribution structure, with the feeder pipe feeding into the distribution chamber at spaced locations around the circumference to provide proper flow into all portions of the distribution chamber and consequently uniform flow to all of the turbine blades. For flow control, there is a main control valve, and two auxiliary flow control valves in opposed branches of the feeder pipe.

BRIEF DESCRIPTION OF THE DRAWINGS

FIG. 5 is an isometric view of a peripheral portion of the turbine wheel, showing several of the turbine blades and the associated housing and vane structure;

FIG. 6 is a front view of one of the turbine blades;

FIG. 7 is a side view of one of the turbine blades taken from a location radially outward of the turbine blade;

FIG. 8 is a rear view of the turbine blades;

FIG. 9 is a top view of the turbine blade; and

FIG. 10 is a top view, similar to FIG. 9, of the turbine blade in a modified position.

DESCRIPTION OF THE PREFERRED EMBODIMENT

Figure 1:
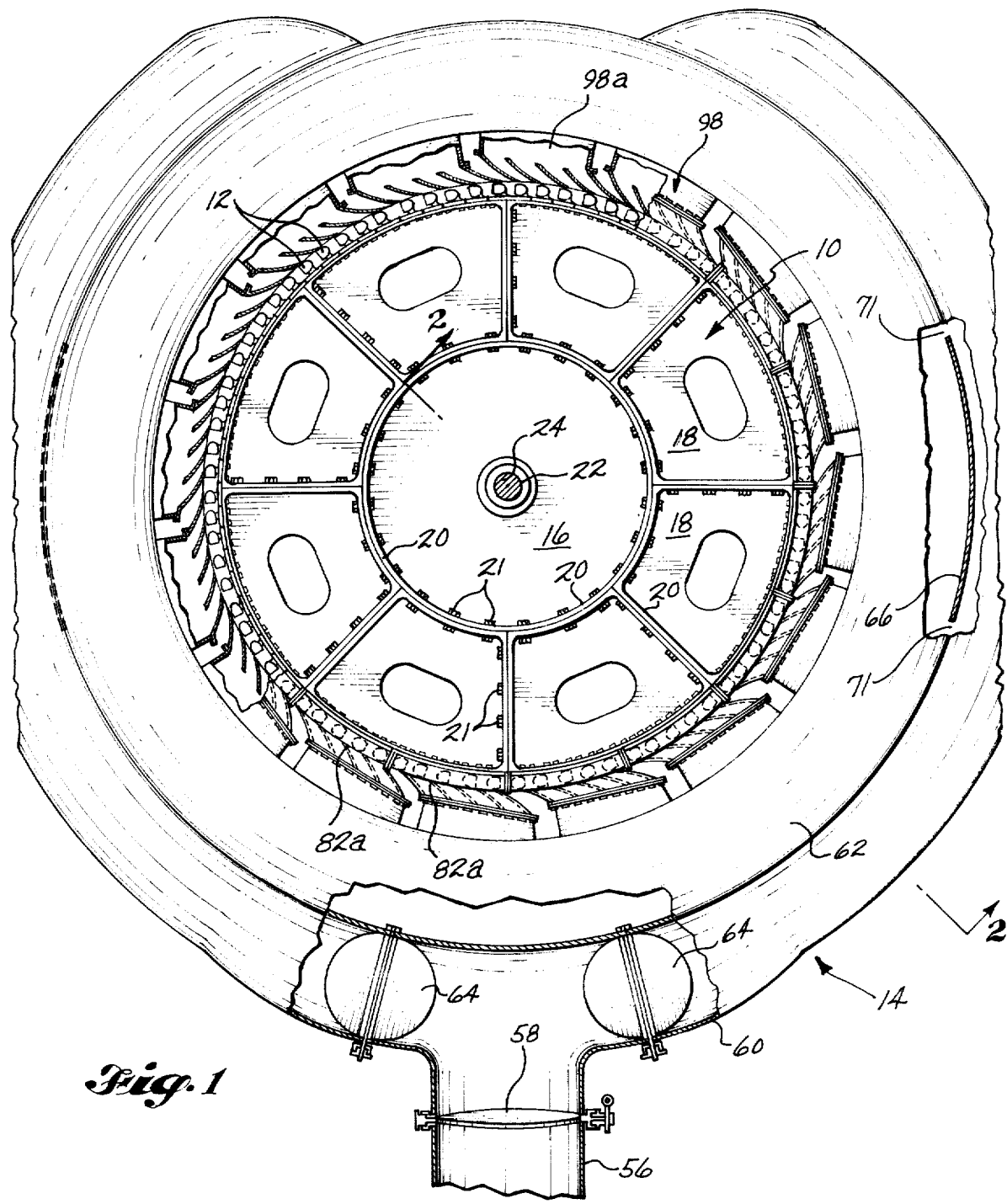
FIG. 1 is a top plan view, partially in section, of the water turbine of the present invention.
Figure 2:
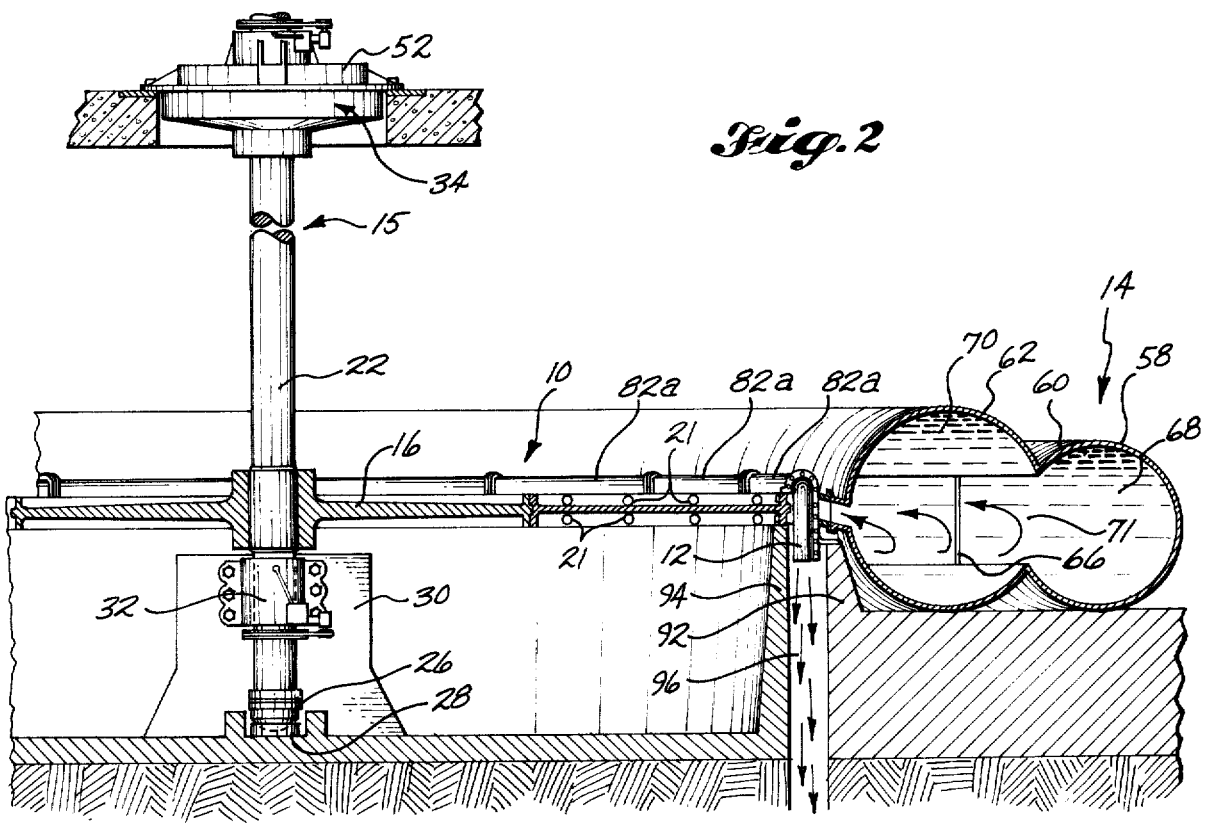
FIG. 2 is a sectional view taken along line 2—2 of FIG. 1.
Figure 3:
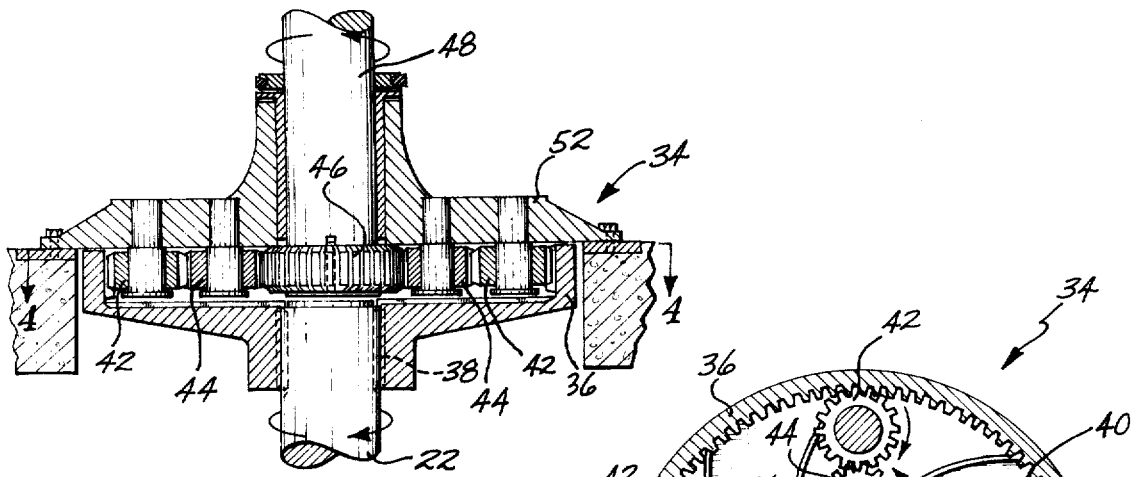
FIG. 3 is a vertical sectional view of the gear transmission of the present invention.

With references to FIGS. 1 and 2, the main components of the present invention comprise: a main sectionalized turbine wheel 10 having a plurality of turbine blades 12 about its outer circumference; a water inlet system 14 positioned peripherally around the turbine wheel 10 and blades 12, and arranged to direct water under pressure against the blades 12; and a power output transmission 15 connected to and extending upwardly from the center axis of the turbine wheel 10.

To describe these components more specifically, the turbine wheel 10 is made in sections, so that these sections can be fabricated at a manufacturing location, and then be shipped to the site of installation where they can be assembled into a single turbine wheel. This arrangement enables the use of a turbine wheel of a quite large diameter to maximize performance, while alleviating potential problems of fabrication and transportation if the wheel were to be made initially as one unit. More specifically, the turbine wheel 10 comprises a center circular hub portion 16 and a plurality of wheel segments 18 entirely surrounding the hub portion 16. As shown herein, there are eight identical wheel segments 18, each having an arcuate length of 45° and completely surrounding the hub 16. The entire peripheral edge of the hub 16 and also of each of the segments 18 has an upstanding flange 20 by which the hub 16 and segments 18 are joined together by suitable means, such as the bolts indicated at 21.

Fixedly connected to the center of the turbine wheel 10 is a main center drive shaft 22 which reaches vertically above and below the horizontal plane of the wheel 10, passing through and fixed in a center hole 24 in the wheel 10. The lower end portion of the shaft 22 terminates in a suitable thrust bearing 26 which is in turn supported from a ground support platform 28 of a mounting block 30. At the upper end of the mounting block 30, there is a split bushing collar 32 which fits around that portion of the shaft 22 just below the turbine wheel 10 to maintain the shaft 22 in proper vertical alignment. It is to be understood that suitable lubricating means would be provided for the relatively moving components. For example, a small oil pump driven by the rotation of the shaft 22 could provide lubricating oil for the split bushing 32.

The upper portion of the main shaft 22 has its upper end connected to a speed augmenting gear transmission, generally designated 34. This gear transmission 34 comprises a ring gear 36 which is joined by two keys at 38 to the upper end of the shaft 22. This ring gear 36 has inwardly directed teeth 40 which mesh with a first set of four outer idler gears 42, which in turn mesh with a second set of four inner idler gears 44, with these gears 44 in turn meshing with a center gear 46 fixedly connected to an upstanding output shaft 48. The output shaft 48 is axially aligned with the main drive shaft 22 and serves as the power input to other power generating means, such as an electric generator. Suitable lubricating means, such as an oil pump, can be provided for the shaft 48.

The idler gears 42 and 44 rotate about respective upwardly extending shafts mounted to a bearing frame casting 52 which is in turn bolted to a stationary structure such as an upper floor structure. At the center of the casting 52, there is suitable bearing means for the shaft 48, such as a brass bushing or the like. The horizontal plate-like connecting portion of the ring gear 36 has its upper surface formed with a plurality of shallow curved vanes 54, which counteract the centrifugal force and direct the lubricating oil to the center portion of the gear transmission 34. Care should be taken to insure that there is sufficient clearance between the vanes 54 and the lower flange ends of the shafts 50. For example, the flange ends of the shafts 50 could be counterbored in the gears 42 or 44.

Figure 4:
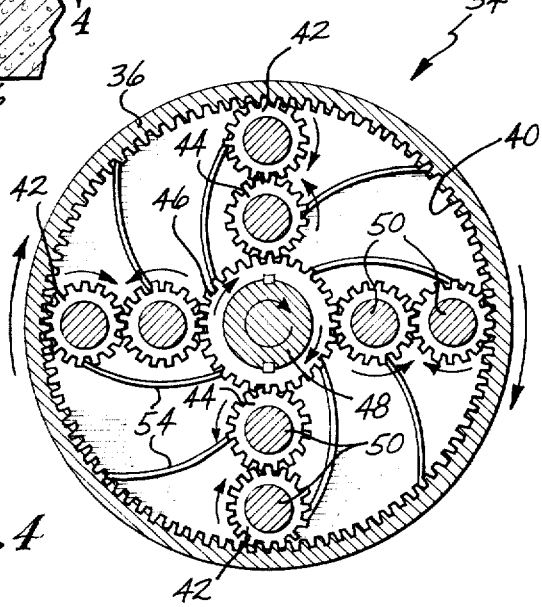
FIG. 4 is a horizontal sectional view taken along line 4—4 of FIG. 3.

The operation of the gear transmission 34 can best be understood with reference to FIG. 4. It can be seen that as the ring gear 36 rotates in a clockwise direction (as seen in the top plan view of FIG. 4), the outer set of idler gears 42 also rotate in a clockwise direction. This in turn causes a counterclockwise direction of the gears 44, which in turn causes a resulting clockwise rotation of the center gear 46 and its associated shaft 48. Because the substantially greater diameter of the ring gear 36 relative to the gear 46, the output drive shaft 48 rotates at a substantially greater rate of speed than the main drive shaft 22. Thus, the relatively slow rotation of the quite large turbine wheel 10 results in a rotational output at a speed more desirable for proper power transformation, as in an electric generator.

With reference again to FIG. 1, the aforementioned water inlet system comprises a main inlet pipe 56 which is connected to a sourse of water under pressure, with the flow through the pipe 56 being controlled by a suitable valve 58. The outlet of the pipe 56 leads into an annular feed pipe 60, which is positioned circumferentially around a distribution pipe 62. The two branches of the feed pipe 60 that extend from the main inlet pipe 56 each have the flow therethrough controlled by a respective one of two secondary control valves 64.

The outer feed pipe is immediately adjacent the inner distribution pipe 62, with a partition wall 66 providing separation between the outer feed passage 68 of the pipe 60 and the inner distribution passage 70 of the pipe 60. This partition wall 66 has a plurality of openings 71 about its circumference to permit the flow of water from the feed passage 68 into the distribution passage 70. Thus, there is a flow of pressurized water substantially uniformly throughout the entire circumferential length of the distribution passage 70, so that there is an even flow of water to the entire circumference of the turbine wheel 10.

Of particular significance in the present invention is the particular arrangement of the turbine blades 12 relative to the flow of water into the blades 12 and the discharge of the water that has impacted the blades 12. With reference to FIGS. 5 through 9, it can be seen that each of the turbine blades 12 is connected to a respective mounting plate 72. Each mounting plate 72 is moderately curved to fit the outer contour of the wheel 10, and has a horizontal central groove 74 which interfits with a tongue member 76 formed on the outer circumference of the wheel 10. Four bolts 78 fixedly connect the mounting plate with its associated blade 12 to the outer flange 20 of the wheel 10. The blade 12 is integral with its associated plate 72 and thus becomes fixedly connected to the wheel 10.

In describing the configuration of each of the blades 12, the term "forward" for "tangentially forward" denotes a direction parallel to the path of travel of the blade 12 as it rotates with the wheel 10, with the term "rearward" obviously denoting the opposite direction. Each blade 12 is generally elongate, with its longitudinal axis being vertically oriented. The rearward face 80 of each blade 12 is the reacting surface of the blade 12 which receives the impact of the water that drives the turbine wheel 10. This surface 80 is curved with respect to both its vertical axis and its lateral axis, with the degree of curvature in the vertical axis being more gradual than the degree of curvature in the lateral axis. Thus, it can be seen that from an approximate midpoint 80a of the reacting surface 80, the surface 80 curves upwardly and rearwardly, with the topmost portion of the surface 80 being at an angle of approximately 45° to the vertical, indicated at a in FIG. 7. On the other hand, the lowermost extension of the reacting surface 80 slants only moderately from the vertical (i.e. in the order of 15°), indicated at b in FIG. 7. The curvature of the surface 80 along a lateral axis is in the order of approximately 90°, indicated at c in FIG. 9, and is sized so as to properly contain the water flowing against the reacting surface 80. Thus, the over all effect of the curvature of the reacting surface 80 is to receive the water from the distribution chamber, and after receiving the impact of this water, to discharge the water downwardly from the lower portion of the turbine blade 12.

So that the blades 12 can better receive the impact of the water, it may be desirable to position each of the blades 12 with its impact surface 80 facing in a direction rearwardly and radially outward from the center of the wheel 10. This arrangement is illustrated in FIG. 10.

The turbine blades 12 are positioned in an annular housing 82 which reaches from the top edge 84 of the outer flange portion 20 of the wheel 10 upwardly in a curved portion 86 which follows rather closely the upper contour of the blades 12, and thence downwardly at 88 along the outside of the blades 12. Thus, the housing 82 substantially encloses the path of the blades 12, while providing a downwardly open discharge path. There is an outwardly extending mounting flange 90 by which the housing 82 is mounted to an outer annular support structure 92. Spaced inwardly from the support structure 92 is a second stationary annular structure 94, with the two annular structures 92 and 94 defining an annular discharge passageway 96 positioned just below the turbine blades 12. For convenience of manufacture and assembly, this annular housing 82 can be made in sections joined together in a suitable manner at the installation site. In FIGS. 1 and 2, these several housing sections are designated 82a.

Water is directed from the peripheral distribution chamber 70 against the blades 12 by a vane assembly 98 extending around the entire circumference of the wheel 10. The vane assembly 98 is made as a plurality of units, 98a, each of which is connected to and leads into a related one of the housing sections 82a. Each vane unit 98a comprises a top and bottom wall 100 and 102, respectively, and a plurality of slanted vane members 104. Each set of adjacent vane members 104 defines therebetween a flow passage or nozzle 106 which leads into the area occupied by the blades 12 in the housing 82. The vanes 104 slant inwardly and at a tangentially forward direction, so that water flowing from the distribution chamber 70 into the vane passageways 106 has a substantial forward force component to impart a corresponding forwardly directed force to the turbine blades 12 and cause rotation of the wheel 10.

In operation, water under pressure flows through the main pipe 56 into the two oppositely diverging passageways of the feed pipe 60. From the feed passageway 68, the water flows into the distribution passageway 70 so as to substantially fill the entire passageway 70. The main control valve 58 and/or the auxiliary control valves 64 can be manipulated to control the flow of water into the apparatus and thus control the power output of the same. Water from the distribution chamber 70 flows in through the vane assembly 98 in a substantially uniform manner around the entire circumference of the vane assembly 98. The vane assembly 98 directs the water into the area of the turbine blades in a tangentially forward and moderately inward direction, so that this water impinges upon the rearwardly facing working face 80 of each of the blades 12.

Because of the particular curved configuration of the impact surface 80 of each of the blades 12, the water imparts a driving force to each blade 12 and then is discharged downwardly into the annular outlet passage 96 positioned beneath the blades 12. This causes the main turbine wheel 10 to rotate under power and cause rotation of the drive shaft 22.

As indicated previously herein, the turbine apparatus of the present invention is particularly adapted to effectively utilize water having a pressure head that is relatively low in comparison with the water driving other turbines. For proper utilization of the water power, the turbine wheel 10 has a relatively large diameter. Thus, even with the outer periphery of the wheel 10 rotating at a reasonably fast linear rate of speed, the rate of rotation of the main shaft 22 is at a relatively slow rate. Thus, the main shaft 22 is connected to the gear transmission 34 to provide an output drive to the shaft 48 at a substantially greater rotational speed. The manner in which this gear transmission 34 operates to accomplish this function is described more particularly earlier herein. The output from the shaft 48 is in turn connected to a suitable power generating device, such as an electric generator or the like.

What is claimed is:
1. A water turbine apparatus, comprising:
   a. a main turbine wheel mounted for rotation about a generally vertical axis;
   b. a plurality of turbine blades mounted to the turbine wheel at spaced intervals along the circumference of the wheel so as to travel a circular tangentially forward path with said wheel about said axis of rotation;
   c. an annular water inlet distribution structure positioned generally circumferentially around said turbine blades and defining a generally annular water distribution chamber also positioned circumferentially around said turbine blades;
   d. a vane structure positioned circumferentially around said turbine blades and defining a plurality of water nozzles positioned substantially circumferentially around said blades and extending from said distribution chamber to said blades in a tangentially forward and inward direction,
   e. a turbine blade housing structure having a generally annular configuration and having top and side walls substantially enclosing the circular path of said turbine blades so as to fit closely adjacent the top and sides of the blades and providing a downwardly open water discharge passage below said turbine path,
   f. each of said turbine blades having a generally concave impact surface which is curved in a vertical plane with the upper end portion of said curve having a substantial upward and rearward slope, whereby water impacting said impact surface is directed downwardly through said discharge passage.

whereby water flowing under pressure from said distribution chamber travels through said vane water passages to impact said turbine blades to cause rotation of said wheel, with the water being discharged from the blades downwardly through said discharge passage.

2. The apparatus as recited in claim 1, wherein said wheel is made up of a center hub section and a plurality of arcuate segments fixedly connected to said hub section and one another, whereby said wheel can have a relatively large diameter, and yet be readily assembled at a location of installation, said wheel having a relatively large diameter, and said apparatus further comprises a main drive shaft fixedly connected to said wheel, a gear speed augmenting transmission operatively connected to said drive shaft, and an output shaft connected to said gear transmission, whereby the relatively slow rotation of said wheel, due to its relatively large diameter, produces an adequately rapid rotation of the output shaft for power transmission.

3. The apparatus as recited in claim 1, further comprising a feeder pipe located generally circumferentially around said distribution structure, with said feeder pipe having openings communicating with the distribution chamber of said distribution structure at locations spaced generally around the entire circumference of said distribution structure, whereby there is adequate water inflow from the feeder pipe to all portions of said distribution chamber, and from the distribution chamber through the nozzles defined by the vane structure.

4. The apparatus as recited in claim 3, where there is a main inlet pipe leading to said feeder pipe, with said feeder pipe branching in generally opposite directions from said inlet pipe, and there is a main valve to control flow through said inlet pipe and two auxiliary valves controlling flow through the two branches of said feeder pipe, whereby proper flow and distribution of water to the feeder pipe can be accomplished.

5. A water turbine apparatus, comprising:
   a. a main turbine wheel mounted for rotation about a generally vertical axis;
   b. a plurality of turbine blades mounted to the turbine wheel at spaced intervals along the circumference of the wheel so as to travel a circular tangentially forward path with said wheel about said axis of rotation;
   c. an annular water inlet distribution structure positioned generally circumferentially around said turbine blades and defining a generally annular water distribution chamber also positioned circumferentially around said turbine blades;
   d. a vane structure positioned circumferentially around said turbine blades and defining a plurality of water nozzles positioned substantially circumferentially around said blades and extending from said distribution chamber to said blades in a tangentially forward and inward direction;
   e. a turbine blade housing structure having a generally annular configuration and substantially enclosing the circular path of said turbine blades and providing a downwardly open water discharge passage below said turbine path;
   f. each of said turbine blades having a generally concave impact surface which is curved in a vertical plane with the upper end portion of said curve having both a substantial upward and rearward slope, whereby water impacting said impact surface is directed downwardly through said discharge passage, the upper end sloping portion of the impact surface of each blade sloping upwardly and rearwardly at approximately a one to one slope, the lateral curvature of each of said blades being at least approximately a right angle curvature, and the vertical slope of the lower portion of the impact surface of each blade being substantially in a downward direction with only moderate rearward slant, whereby water flowing under pressure from said distribution chamber travels through said vane water passages to impact said turbine blades to cause rotation of said wheel, with the water being discharged from said blades downwardly through said discharge passage.

* * * * *